US010035034B1

(12) United States Patent
Hixon et al.

(10) Patent No.: US 10,035,034 B1
(45) Date of Patent: Jul. 31, 2018

(54) SYSTEMS AND METHODS FOR LOCKING A STARTING BLOCK STEM WITHIN AN ANCHOR

(71) Applicant: Everlast Climbing Industries, Inc., Mendota Heights, MN (US)

(72) Inventors: Joshua Earl Hixon, Corvallis, MT (US); Shane Clagett, Stevensville, MT (US)

(73) Assignee: EVERLAST CLIMBING INDUSTRIES, INC., Mendota Heights, MN (US)

( * ) Notice: Subject to any disclaimer, the term of this patent is extended or adjusted under 35 U.S.C. 154(b) by 0 days.

(21) Appl. No.: 15/636,182

(22) Filed: Jun. 28, 2017

(51) Int. Cl.
*A63B 5/10* (2006.01)
*A63K 3/02* (2006.01)
*E04H 12/22* (2006.01)
*E04H 4/14* (2006.01)
*F16B 13/06* (2006.01)

(52) U.S. Cl.
CPC .............. *A63B 5/10* (2013.01); *A63K 3/02* (2013.01); *E04H 4/14* (2013.01); *E04H 12/2269* (2013.01); *F16B 13/066* (2013.01)

(58) Field of Classification Search
CPC ........ A63B 5/10; F16B 13/066; F16B 13/068; F16B 13/0891; F16B 13/0858; E04H 4/14; E04H 12/2269; A63K 3/02
USPC ............ 52/704, 706, 711; 411/24–27, 75–77
See application file for complete search history.

(56) References Cited

U.S. PATENT DOCUMENTS

| | | | | | |
|---|---|---|---|---|---|
| 914,103 | A | * | 3/1909 | Berry | F16B 13/068 411/24 |
| 1,120,409 | A | * | 12/1914 | Rohmer et al. | F16B 13/068 411/24 |
| 1,349,437 | A | * | 8/1920 | Royer | F16B 13/068 411/24 |
| 2,525,198 | A | * | 10/1950 | Beijl | E21D 21/008 405/259.3 |
| 3,054,320 | A | * | 9/1962 | Dickow | F16B 13/068 411/26 |
| 3,303,736 | A | * | 2/1967 | Raynovich, Jr. | E21D 21/008 411/26 |

(Continued)

OTHER PUBLICATIONS

S.R. Smith, Starting Platforms, RockSolid™ Anchor, www.srsmith.com, 2010, 1 page.

*Primary Examiner* — Brian E Glessner
*Assistant Examiner* — Adam G Barlow
(74) *Attorney, Agent, or Firm* — McAndrews, Held & Malloy, Ltd.

(57) ABSTRACT

A starting block lock having a clamp, top and bottom locking wedges, and a rod is provided. The clamp includes top and bottom portions each having an inside surface and a body between the top and bottom portions. The body includes a cylindrical bore extending on a longitudinal axis between the top and bottom portions. The top and bottom locking wedges each include an outer surface, an inner surface, a side surface, and an aperture extending between and through the outer and inner surfaces. At least a portion of each of the side surfaces slidably contact the inside surface of the clamp. The rod extends through the apertures and the cylindrical bore and is configured rotate in a first direction to linearly displace the top and bottom locking wedges toward each other thereby providing an outward force against the inside surfaces of the clamp to expand the clamp.

51 Claims, 14 Drawing Sheets

(56) References Cited

U.S. PATENT DOCUMENTS

| | | | | |
|---|---|---|---|---|
| 3,403,880 | A | * | 10/1968 | Rude .................... A63B 5/10 248/346.03 |
| 3,432,214 | A | * | 3/1969 | Cashman .............. F16C 11/02 384/292 |
| 4,089,613 | A | * | 5/1978 | Babbitt, Jr. ........... F16B 5/025 403/370 |
| 4,094,054 | A | * | 6/1978 | Fischer ................. E04B 1/41 29/460 |
| 4,666,147 | A | * | 5/1987 | Warman ................ A63B 5/10 182/115 |
| 5,660,013 | A | | 8/1997 | Saldarelli et al. |
| 5,816,759 | A | * | 10/1998 | Ernst .................... F16B 13/066 411/24 |
| 6,357,960 | B1 | * | 3/2002 | Cornelius .............. F16B 5/002 403/370 |
| 7,058,994 | B2 | | 6/2006 | Weimer et al. |
| 7,150,595 | B2 | * | 12/2006 | Liebig .................. F16B 13/066 411/60.3 |
| 7,155,867 | B2 | * | 1/2007 | Saldarelli ............. E04H 12/2261 52/170 |
| 8,511,035 | B2 | * | 8/2013 | Zimmer ................ F16B 13/144 411/32 |
| 8,661,767 | B2 | | 3/2014 | Svendsen |
| 2003/0052460 | A1 | * | 3/2003 | Choy .................... F16B 7/025 277/607 |
| 2004/0199990 | A1 | * | 10/2004 | Weimer ................ A63B 5/10 4/496 |
| 2012/0311947 | A1 | * | 12/2012 | Van Wissen ......... F16B 13/066 52/250 |
| 2016/0114238 | A1 | * | 4/2016 | Santino, Jr. .......... G08B 5/38 340/4.13 |

* cited by examiner

--- PRIOR ART ---

--- PRIOR ART ---

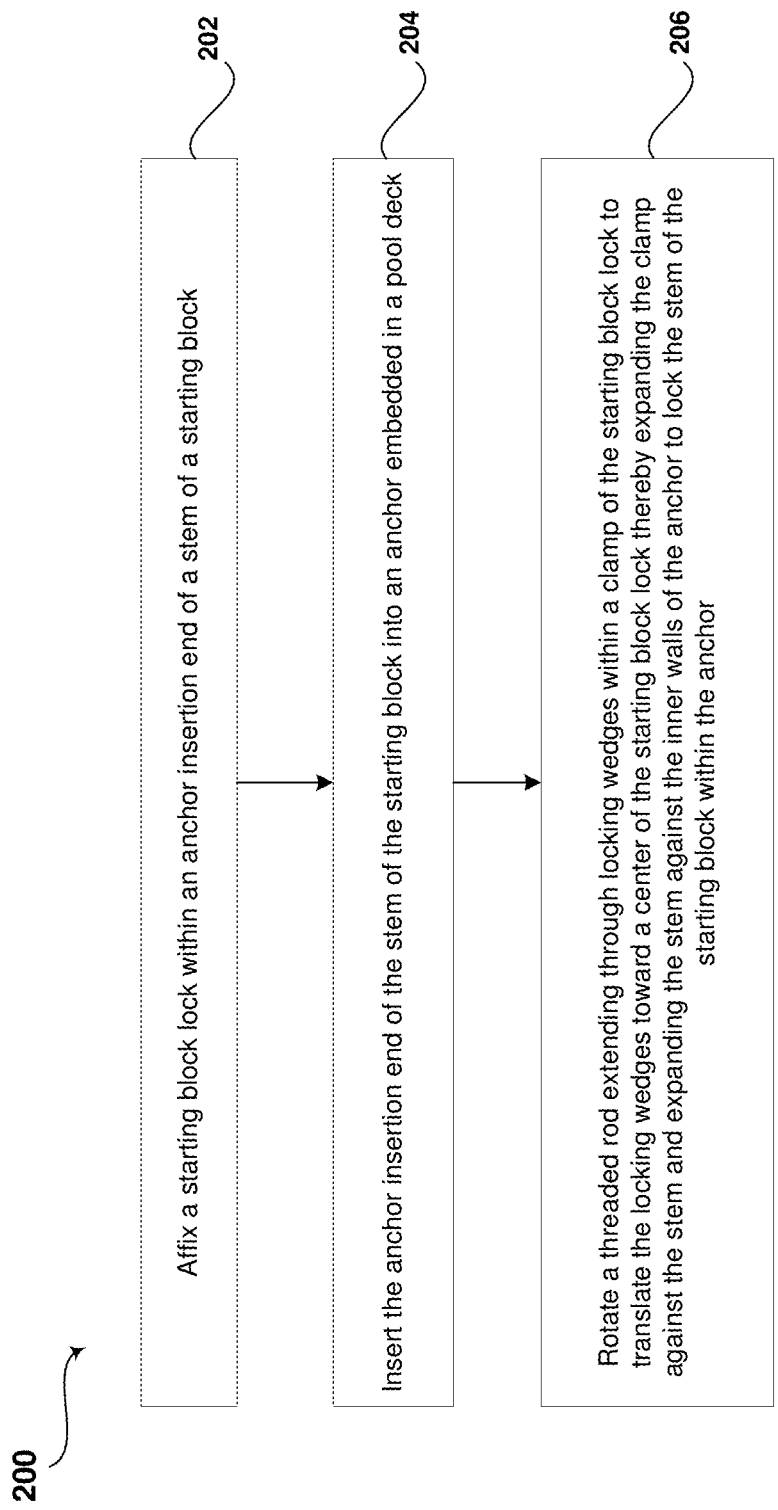

SYSTEMS AND METHODS FOR LOCKING A STARTING BLOCK STEM WITHIN AN ANCHOR

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD

Certain embodiments are related to systems and methods for locking a starting block stem within an anchor. More specifically, various embodiments provide a starting block lock configured to securely lock a stem of a starting block within a conventional anchor embedded, for example, in a concrete pool deck.

BACKGROUND

FIG. 1 illustrates a side elevation view of an exemplary starting block 10 as known in the art. The starting block 10 may include a platform 12 attached to a carriage assembly including one or more stems (also referred to as posts) 14. The stems 14 may be detachably coupled to an anchor embedded in concrete 1 or any suitable material of a pool deck. The starting block 10 may be removed, for example, when not in use by removing the stems 14 from the anchors.

FIG. 2 illustrates a top, front perspective view of an exemplary anchor assembly 20 as known in the art. The anchor assembly 20 may include a body 22 having an opening 24. The opening 24 may be configured to receive a stem 14 of a starting block 10. The opening 24 of the anchor assembly 20 may be covered by a lid 26 when the anchor assembly 20 is not in use, such as when the anchor assembly is not receiving the stem 14 of a starting block 10. The anchor assembly 20 is typically a metal socket configured to be embedded in a pool deck, such as concrete 1 or any suitable material.

Existing starting blocks 10 may have difficulties securely fastening within conventional anchor assemblies 20. The starting block 10 may wobble if the stem(s) 14 of the starting block is not securely fastened within the anchor assembly 20. To address the problem of a wobbly connection between a starting block stem 14 and an anchor assembly 20, various specialized assemblies have been developed. For example, U.S. Pat. No. 7,058,994 by Wiemer et al. discloses a cylindrical anchor/post mating system having a post with a mating key element configured to mate with an anchor key element when the post is inserted into the anchor. As another example, U.S. Pat. No. 8,661,767 by Svendsen teaches an anchor having a wedge assembly whereby rotation of an adjustment bolt of the wedge assembly moves an upper and lower wedge member together, and the wedge engagement with a central wedge member causes the central wedge member to move toward engagement with the tube to secure the tube within a base body. These starting block fastening systems use specialized anchor assemblies and/or specialized post/anchor connections. Accordingly, the specialized systems may require that existing anchor assemblies be replaced, which may be time consuming, difficult, and expensive. Moreover, specialized systems may only work with certain corresponding starting block stems, which may not be practical because it limits the type of starting block and/or starting block stem that may be implemented with the specialized anchor assembly and/or specialized post/anchor connection.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Systems and methods for locking a starting block stem within an anchor are provided, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 14 is a flow diagram that illustrates exemplary steps for locking a starting block stem within an anchor in accordance with an embodiment of the present disclosure.

DETAILED DESCRIPTION

Figure 1:
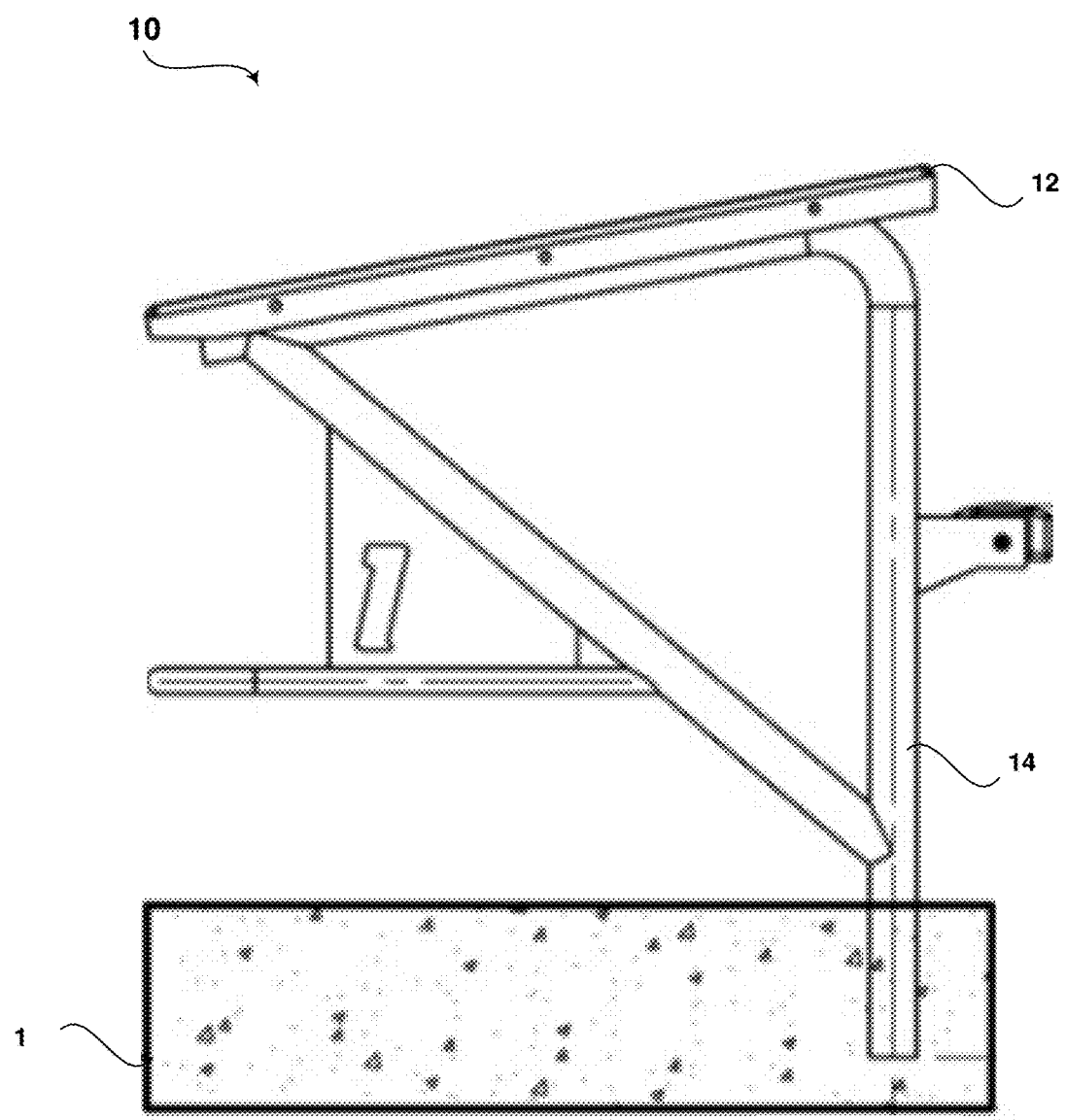
FIG. 1 illustrates a side elevation view of an exemplary starting block as known in the art.
Figure 2:
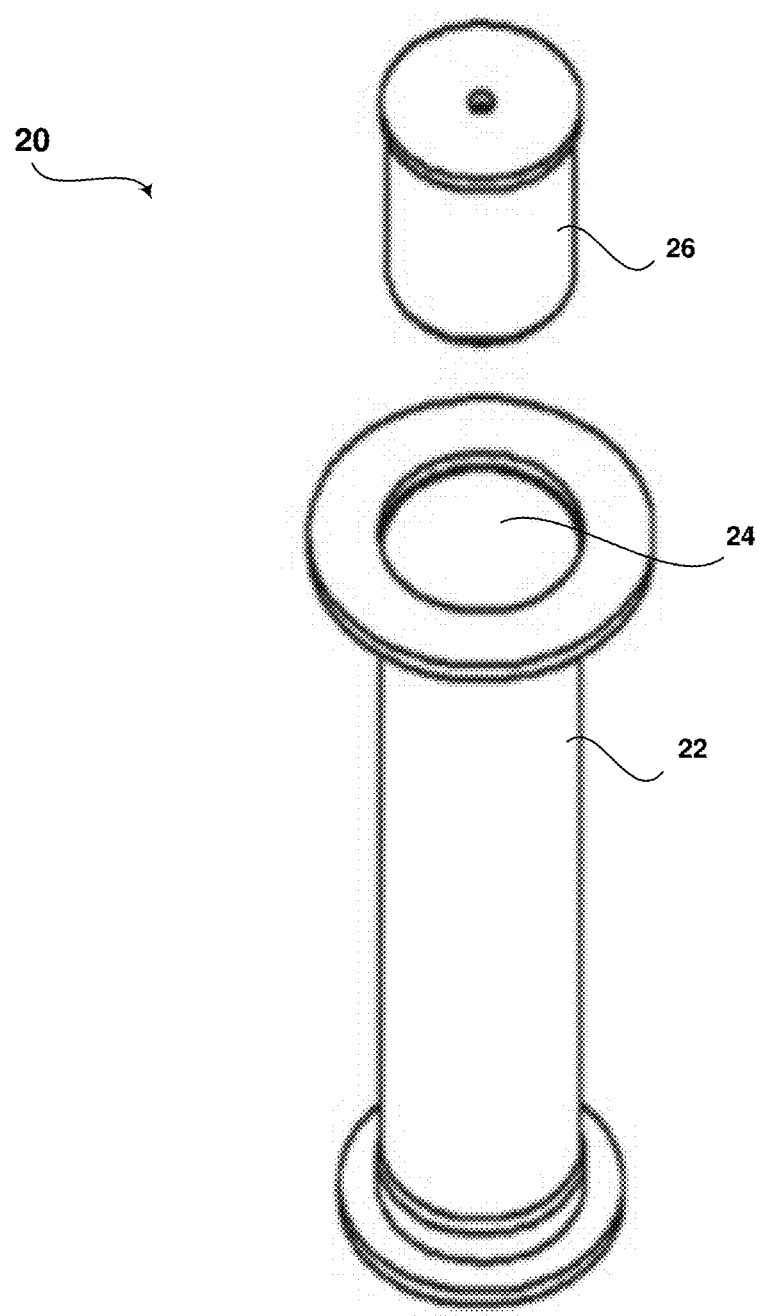
FIG. 2 illustrates a top, front perspective view of an exemplary anchor assembly as known in the art.

Certain embodiments may be found in a starting block lock 100 and methods 200 for locking a starting block stem 14 within an anchor 20. More specifically, certain embodiments provide a starting block lock 100 affixed to a slotted 16 anchor insertion end 15 of a stem 14 of a starting block 10. The starting block lock 100 may include a rod 110 extending through locking wedges 120 housed within a clamp 130. The rod 110 may be rotated to linearly translate the locking wedges 120 toward a center of the starting block lock 100. The locking wedges 120 may expand the clamp 130 against the slotted 16 stem 14 and the slotted 16 stem 14 against the inner walls of the conventional anchor 20 to lock the stem 14 of the starting block 10 within the conventional anchor 20 as the locking wedges 120 are linearly displaced.

Figure 3:
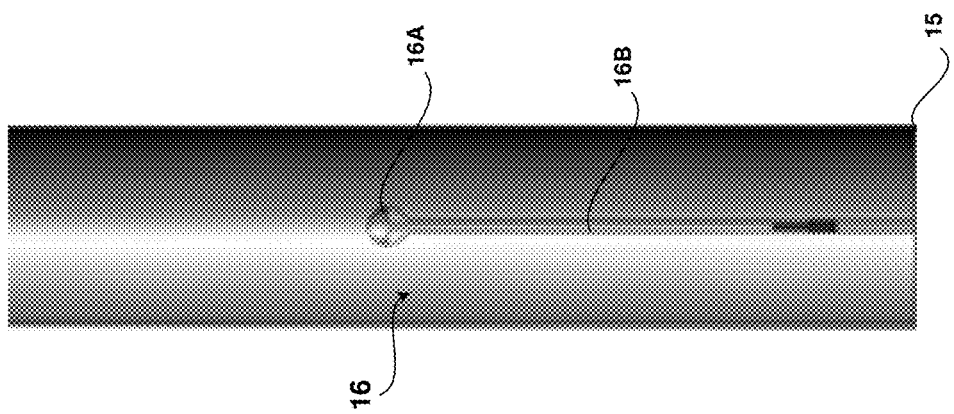
FIG. 3 illustrates a side elevation view of an exemplary slotted starting block stem in accordance with an embodiment of the present disclosure.

FIG. 3 illustrates a side elevation view of an exemplary slotted 16 starting block stem 14 in accordance with an embodiment of the present disclosure. Referring to FIG. 3, starting block stem 14 may have a diameter in a range of 1.90 to 2.01 inches, or any suitable diameter. The starting block stem 14 may include one or more slots 16 at an anchor insertion end of the stem 14. For example, the slot(s) 16 may extend from the end 15 of the stem 16 to approximately 6 inches (defined as 4 to 8 inches) for use with approximately 6 inch deep anchor assemblies 20. As another example, the slot(s) 16 may extend from the end 15 of the stem 16 to approximately 10 inches (defined as 8 to 12 inches) for use with approximately 10 inch deep anchor assemblies 20. Although one slot 16 is shown in FIG. 3, it is contemplated that the stem 16 may include 2, 3, 4, or any suitable number of slots 16. The slots 16 may be parallel and positioned substantially equidistantly around the anchor insertion end of the stem 14. The stem 14 may be configured to house a starting block lock 100, as described below at least with respect to FIGS. 4-7, at the anchor insertion end of the stem 14. Referring again to FIG. 3, the slot(s) 16 may be configured to allow the anchor insertion end of the stem 14 to expand if the starting block lock 100 provides an outward force against the inner walls of the stem 14 at the anchor insertion end. In certain embodiments, the stem 14 may expand up to approximately ⅛ of an inch. In various embodiments, the slot(s) 16 may be a keyhole slot or any suitable slot type. For example, a keyhole slot 16 may have a keyhole portion 16A and a slotted portion 16B. The keyhole portion 16A may be located at one end of the slot 16 and the slotted portion 16B may extend from the keyhole portion 16A to the end 15 of the stem 14.

Figure 4:
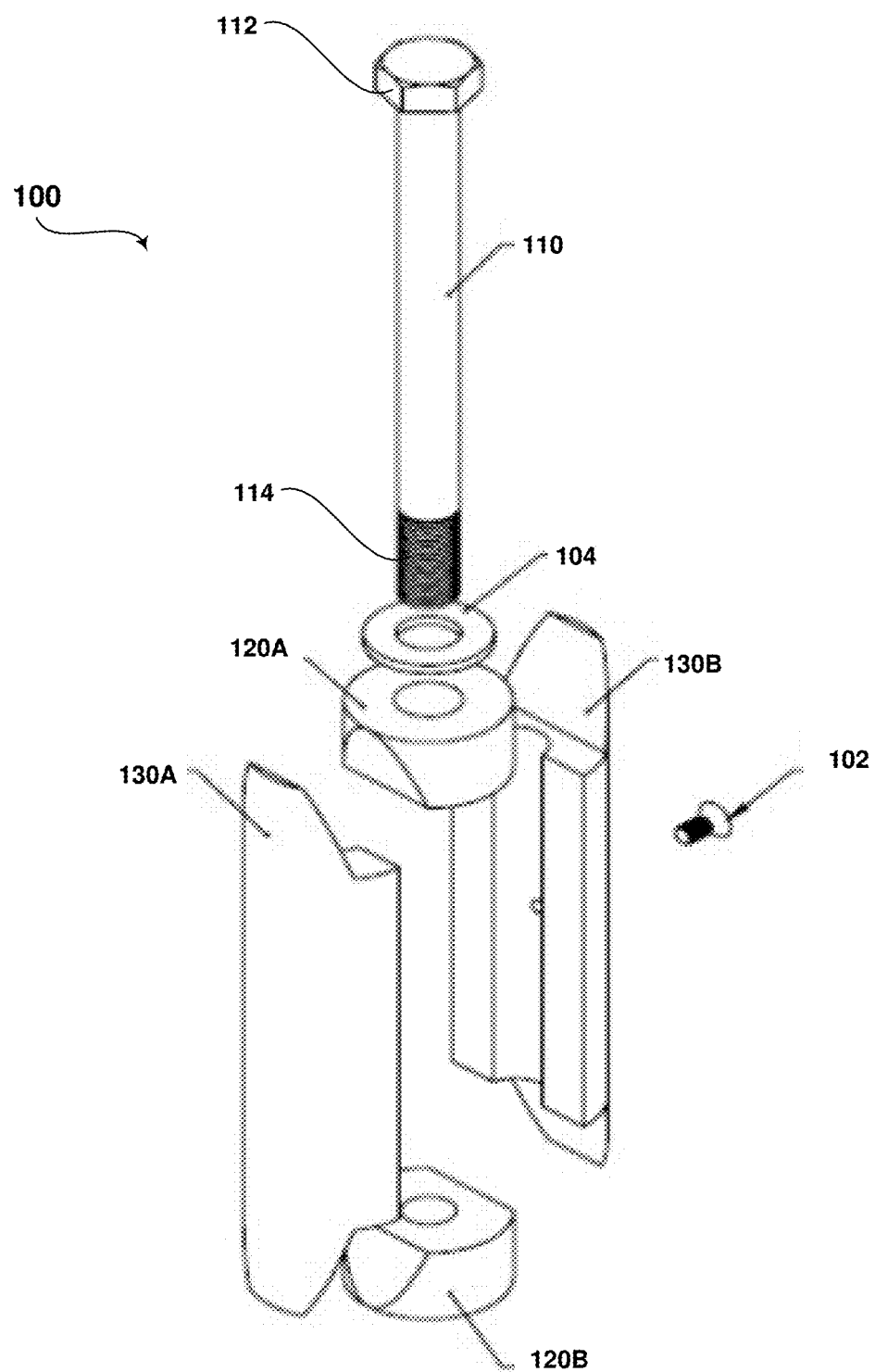
FIG. 4 illustrates an exploded view of an exemplary starting block lock in accordance with an embodiment of the present disclosure.
Figure 5:
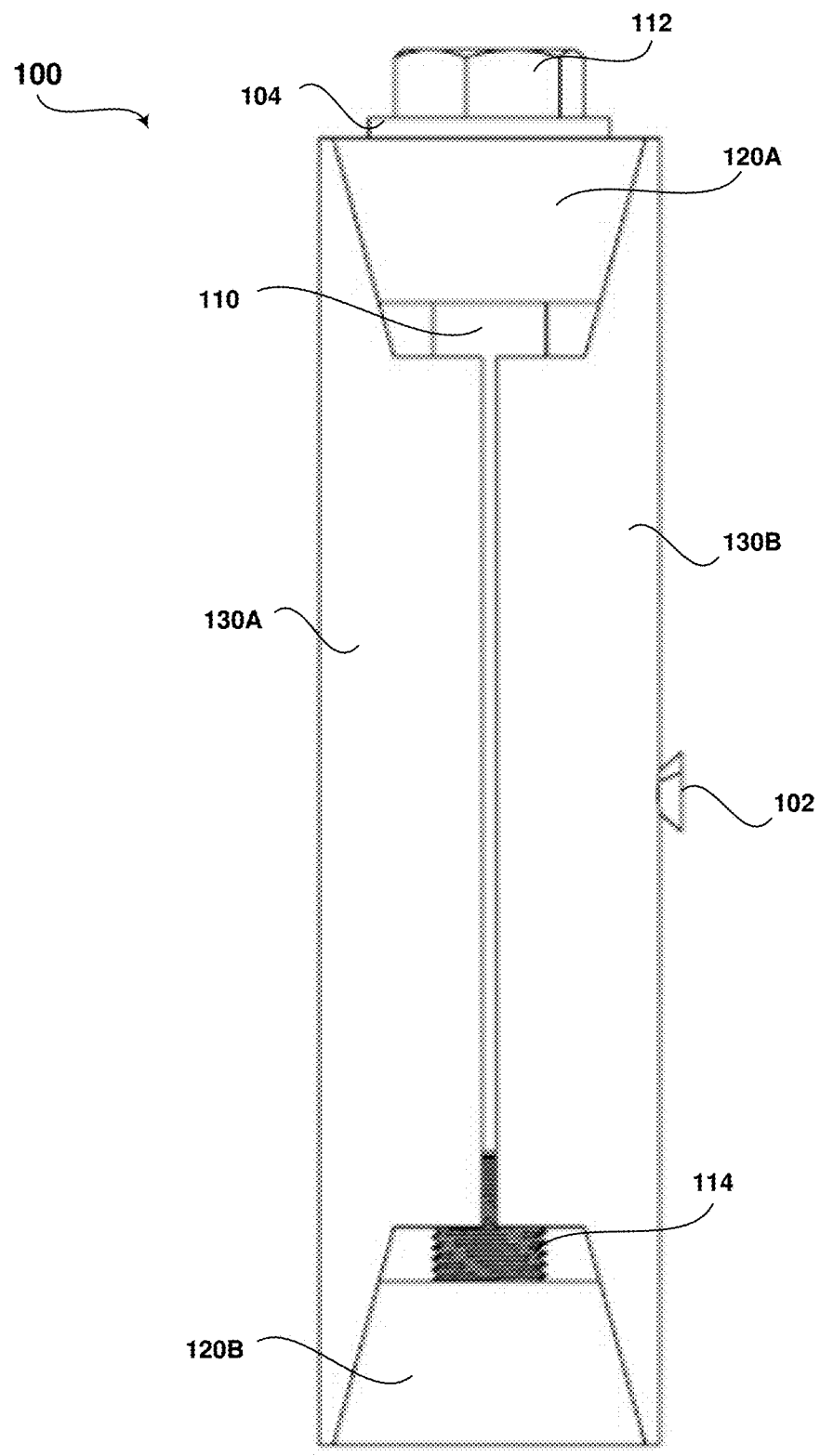
FIG. 5 illustrates a side elevation view of an exemplary starting block lock in accordance with an embodiment of the present disclosure.
Figure 6:
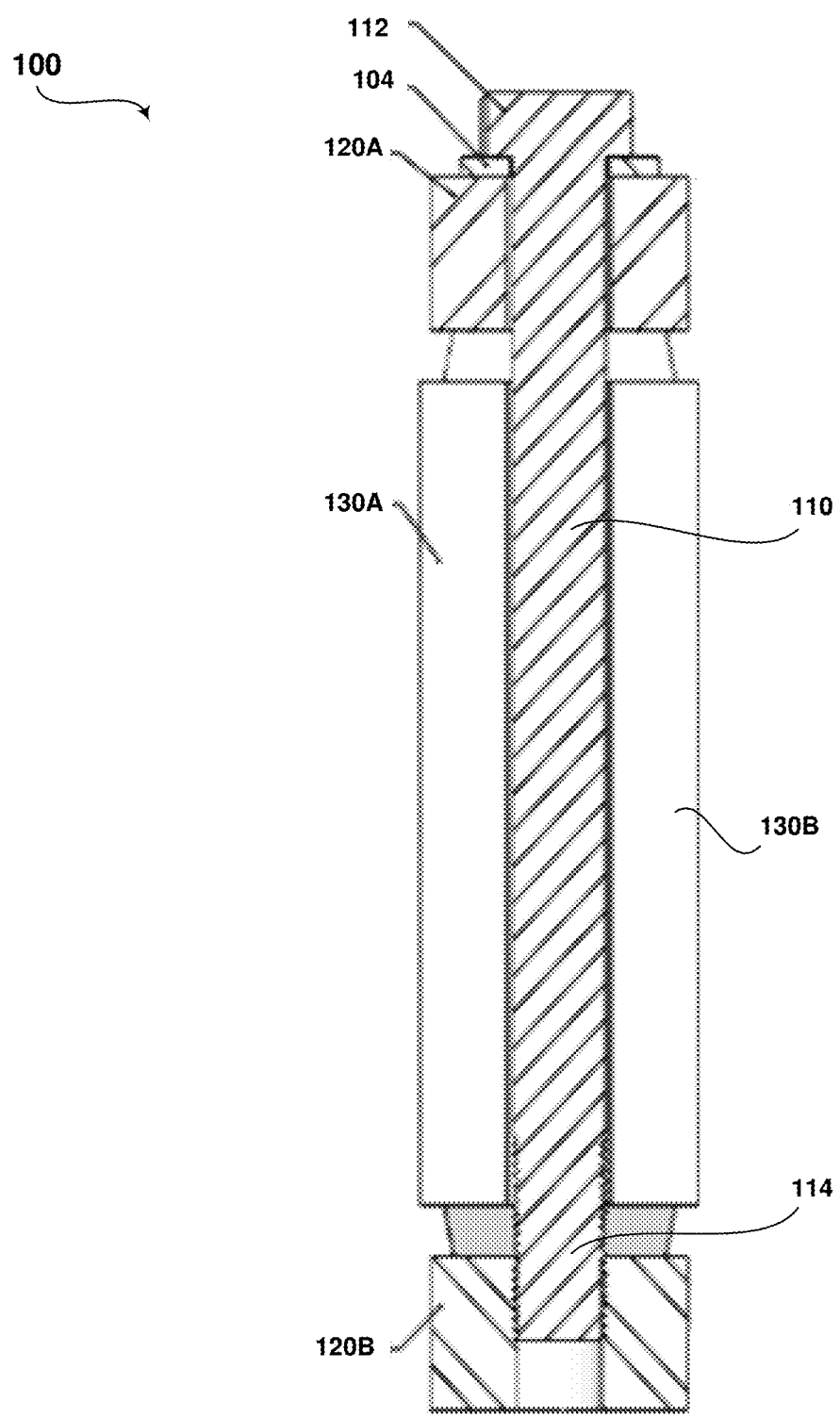
FIG. 6 illustrates a partial cross-sectional view of an exemplary starting block lock in accordance with an embodiment of the present disclosure.

FIG. 4 illustrates an exploded view of an exemplary starting block lock 100 in accordance with an embodiment of the present disclosure. FIG. 5 illustrates a side elevation view of an exemplary starting block lock 100 in accordance with an embodiment of the present disclosure. FIG. 6 illustrates a partial cross-sectional view of an exemplary starting block lock 100 in accordance with an embodiment of the present disclosure. Referring to FIGS. 4-6, the starting block lock 100 may include a rod 110, locking wedges 120, and a clamp 130. The rod 110 may include a first end having a drive head 112 and a second end having a threaded portion 114. The drive head 112 may be hex-shaped or any suitable shape and is configured to be rotated by a correspondingly shaped tool to expand (e.g., tighten) and retract (e.g., loosen) the starting block lock 100. The rod 110 may extend through a top locking wedge 120A and bottom locking wedge 120B. The threaded portion 114 may be at least approximately 1½ inches long.

The top locking wedge 120A is positioned at the drive head 112 end of the threaded rod 110 and is configured to be linearly displaced by the drive head 112 as the rod 110 is rotated. In various embodiments, a washer 104 may be used between the drive head 112 and top locking wedge 120A to evenly distribute pressure applied to the top locking wedge 120A by the drive head 112 and to reduce friction thereby prolonging the life of the top locking wedge 120A. The bottom locking wedge 120B is positioned on the threaded portion 114 of the rod 110 and is configured to linearly traverse the threaded portion 114 of the rod 110 as the rod 110 is rotated. For example, each of the top locking wedge 120A and the bottom locking wedge 120B may be linearly displaced approximately ⅜ of an inch in a first direction toward each other to tighten and/or expand the starting block lock 100 and in a second direction away from each other to loosen and/or retract the starting block lock 100. The locking wedges 120 may have one or more tapered side surfaces such that the portion of the wedges 120 at the ends of the starting block lock 100 have a greater thickness than portion of the wedges 120 positioned toward the center of the starting block lock 100. The tapered side surfaces of the locking wedges 120 may abut and/or press against tapered inside surfaces at the ends of the clamp 130. In various embodiments, the locking wedges 120 may be bronze, plastic, or any suitable material The rod 110 and locking wedge 120 components may be at least partially disposed within a clamp 130. In various embodiments, the clamp 130 may be stainless steel, plastic, or any suitable material. The starting block lock 100 may be held in a fixed position within the anchor insertion end of the stem 14 by one or more screws 102, or any suitable attachment mechanism, coupling the clamp 130 to the stem 14. The clamp 130 may include one or more portions, such as first 130A and second 130B clamp halves as shown in FIG. 4. Referring again to FIGS. 4-6, the clamp portions 130A, 130B form a substantially cylindrical shape for use, for example, with a corresponding substantially cylindrical shaped inside surface of a starting block stem 14. Although FIGS. 4-6 illustrate a substantially cylindrical shape, the clamp portions 130A, 130B may be any suitable shape for use with a corresponding suitably shaped inside surface of a stem 14. As an example, the clamp portions 130A, 130B may be substantially square shaped for use with a corresponding substantially square shaped inside surface of a stem 14. The rod 110 may extend through the clamp portions 130A, 130B and hold the locking wedges 120A, 120B against tapered side surfaces at the ends of the clamp portions 130A, 130B. The ends of the clamp portions 130A, 130B may be tapered such that the clamp portions 130A, 130B are thinner at the ends and increase in thickness toward the center of the clamp portions 130A, 130B.

Figure 7:
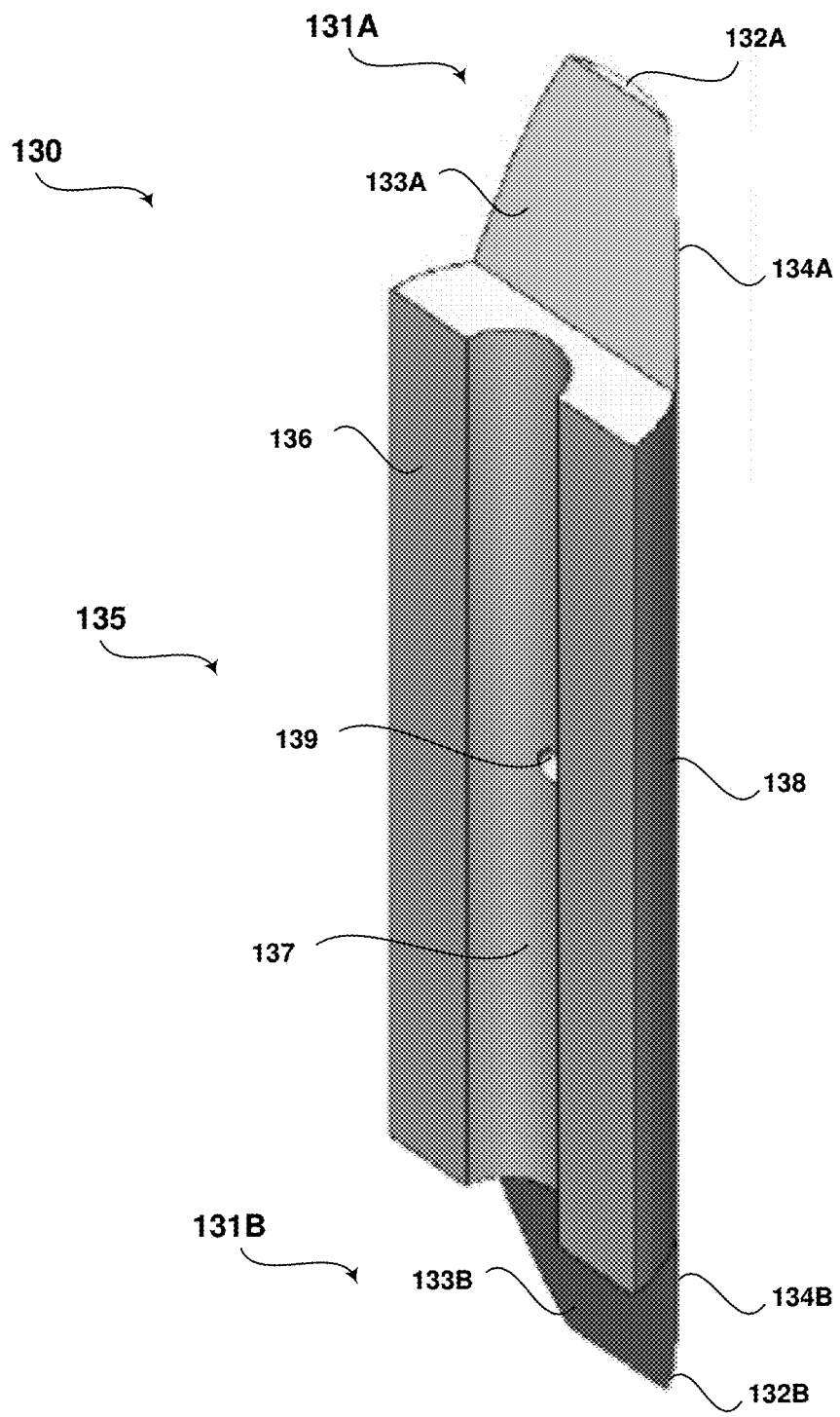
FIG. 7 illustrates an inner perspective view of a portion of an exemplary clamp of a starting block lock in accordance with an embodiment of the present disclosure.
Figure 8:
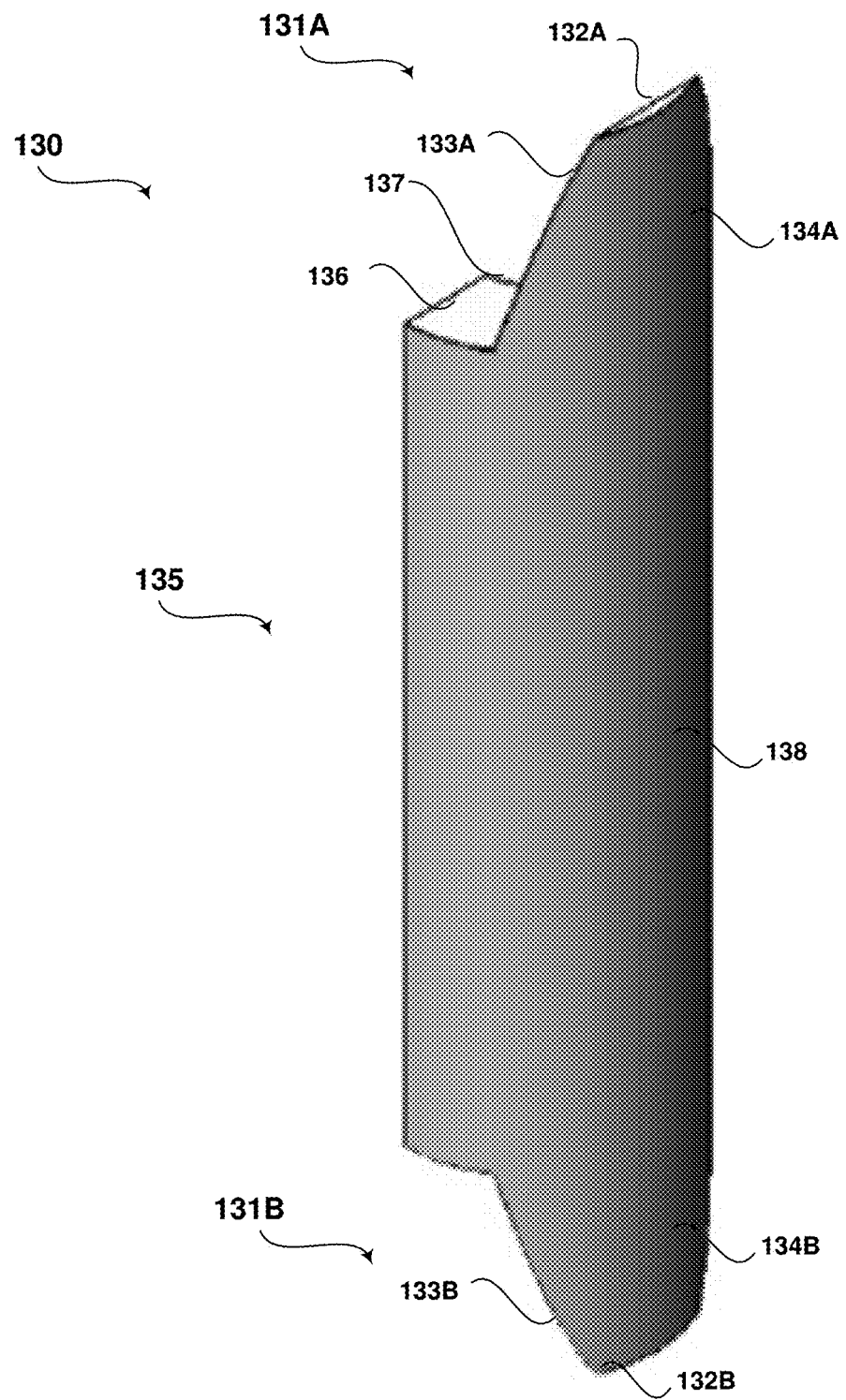
FIG. 8 illustrates an outer perspective view of a portion of an exemplary clamp of a starting block lock in accordance with an embodiment of the present disclosure.
Figure 9:
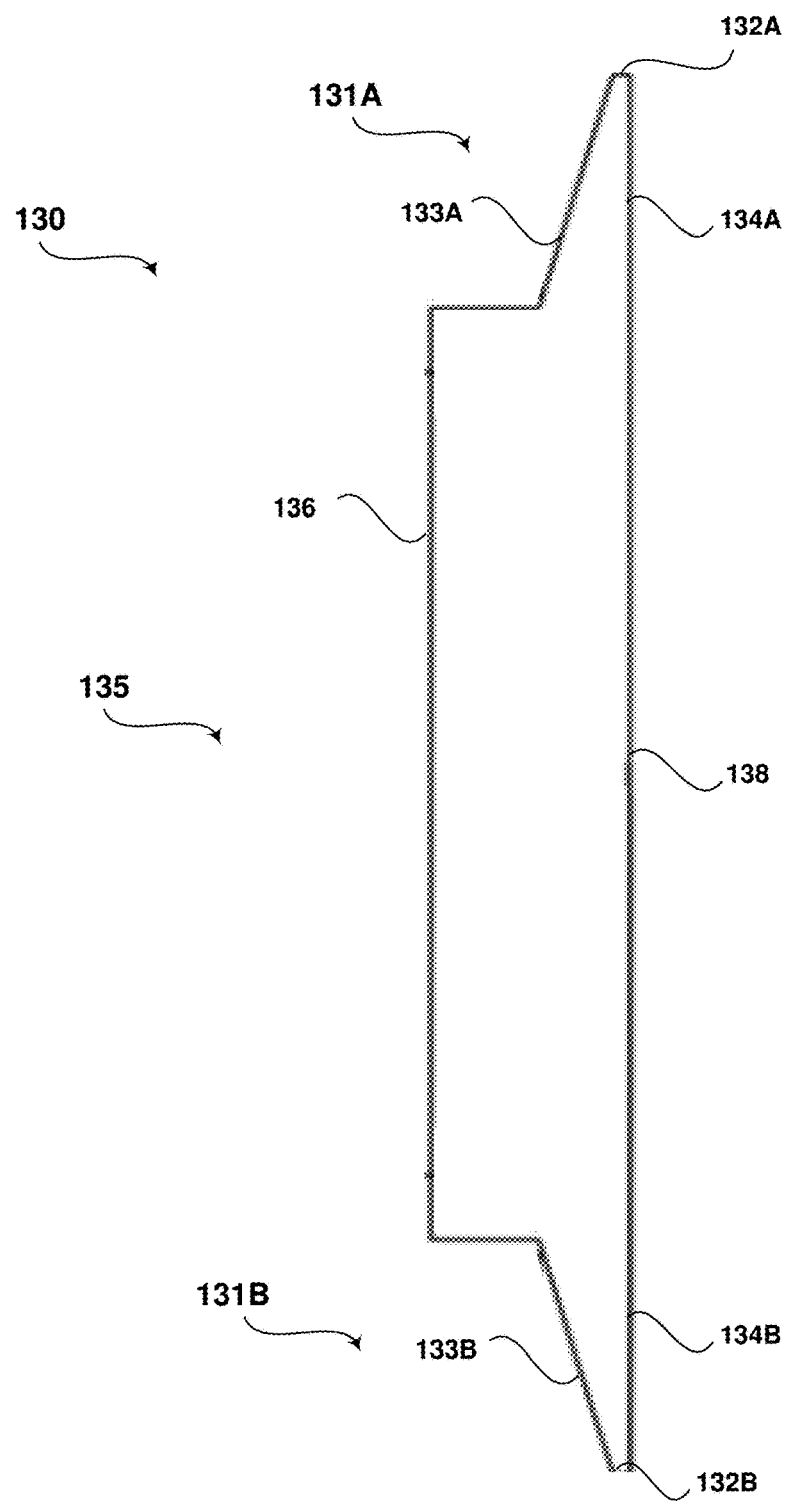
FIG. 9 illustrates a side elevation view of a portion of an exemplary clamp of a starting block lock in accordance with an embodiment of the present disclosure.
Figure 10:
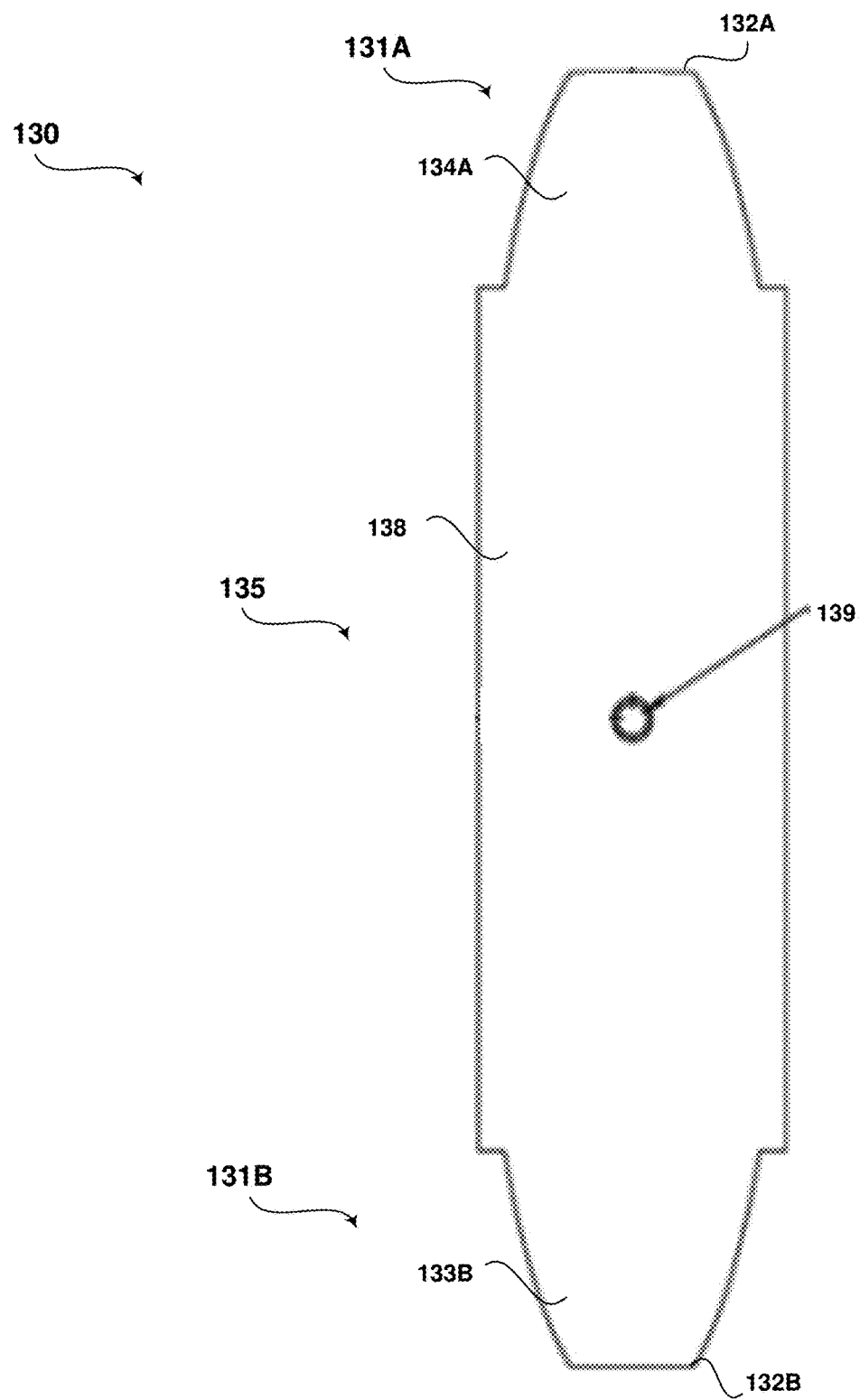
FIG. 10 illustrates an elevation view of an outer portion of an exemplary clamp of a starting block lock in accordance with an embodiment of the present disclosure.

FIG. 7 illustrates an inner perspective view of a portion of an exemplary clamp 130 of a starting block lock 100 in accordance with an embodiment of the present disclosure. FIG. 8 illustrates an outer perspective view of a portion of an exemplary clamp 130 of a starting block lock 100 in accordance with an embodiment of the present disclosure. FIG. 9 illustrates a side elevation view of a portion of an exemplary clamp 130 of a starting block lock 100 in accordance with an embodiment of the present disclosure. FIG. 10 illustrates an elevation view of an outer portion of an exemplary clamp 130 of a starting block lock 100 in accordance with an embodiment of the present disclosure.

Figure 11:
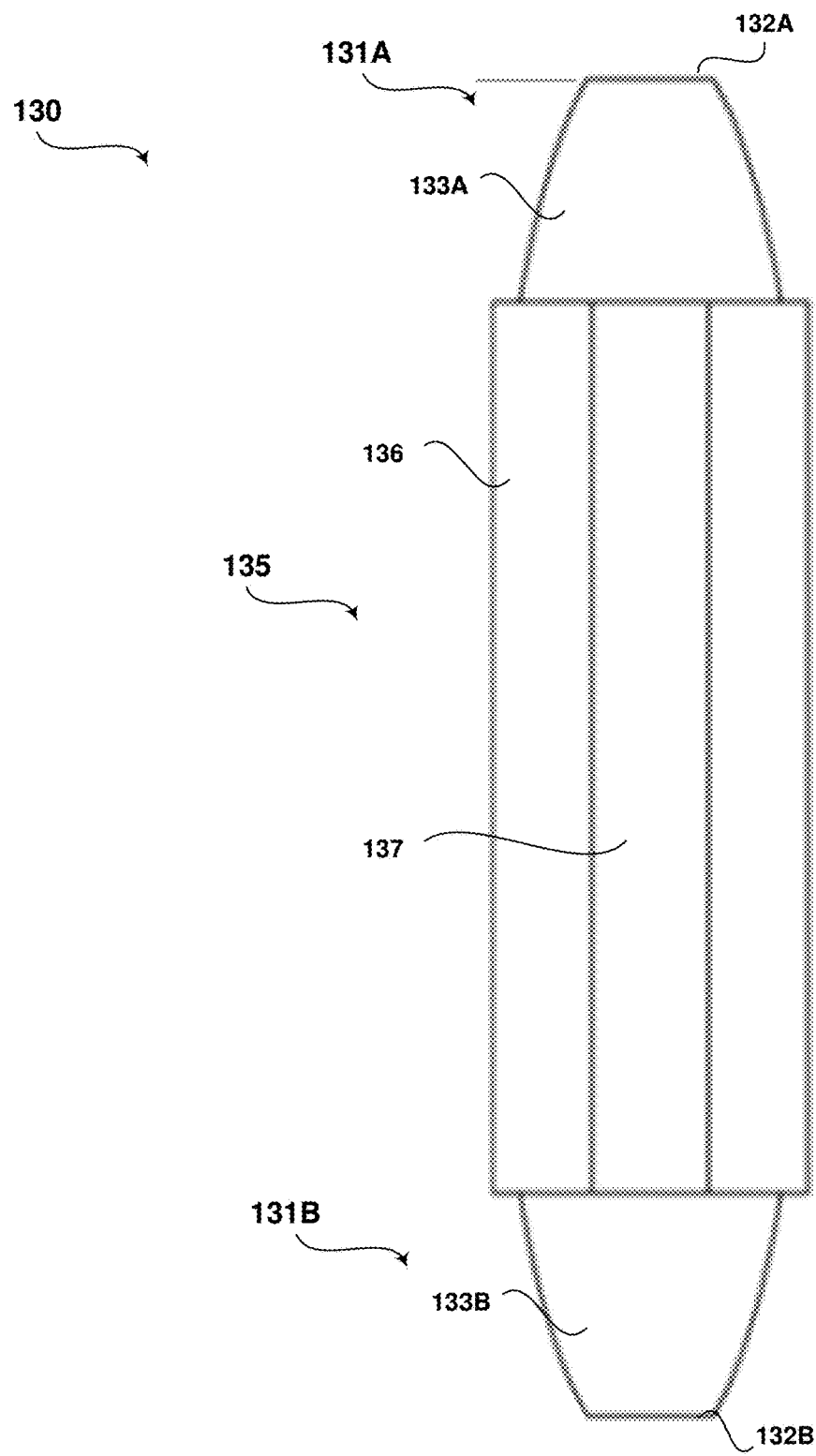
FIG. 11 illustrates an elevation view of an inner portion of an exemplary clamp of a starting block lock in accordance with an embodiment of the present disclosure.

FIG. 11 illustrates an elevation view of an inner portion of an exemplary clamp 130 of a starting block lock 100 in accordance with an embodiment of the present disclosure.

Referring to FIGS. 7-11, one half of an exemplary clamp 130 is shown. The illustrated clamp half is configured to be used with a second corresponding half to form the clamp 130 of the starting block lock 100. Although FIGS. 7-11 illustrate a half of clamp 130, the clamp 130 may be more or less pieces. The clamp 130 may include a top portion 131A, a bottom portion 131B, and a central portion 135. The central portion 135 may include a body 136. The body 136 may include a cylindrical bore 137 extending along a longitudinal axis through the body 136 between the top 131A and bottom 131B portions of the clamp 130. The body 136 may include a body outer surface 138 that may have a curved, squared, or any suitable shape for use with a corresponding suitably shaped inside surface of a starting block stem 14. The body 136 may include a screw hole 139 extending into and/or through the body outer surface 138 configured to receive a screw 102 or any suitable attachment mechanism to affix the clamp 130 to an inside surface of a starting block stem 14 at an anchor insertion end of the stem 14.

The top 131A and bottom 131B portions of the clamp 130 may include inside surfaces 133A, 133B, outer surfaces 134A, 134B, and ends 132A, 132B. The inside 133A, 133B and outer 134A, 134B surfaces of the top and bottom portions 131A, 131B may respectively extend between an end 132A, 132B and the body 136 of the central portion 135. The outer surfaces 134A, 134B may have a curved, squared, or any suitable shape for use with a corresponding suitably shaped inside surface of a starting block stem 14. The inside surfaces 133A, 133B may be tapered such that the top 131A and bottom 131B portions have a greatest thickness adjacent the body 136 of the central portion 135 and a smallest thickness at the ends 132A, 132B. The inside surfaces 133A, 133B may be configured to contact tapered side surfaces of locking wedges 120A, 120B.

Figure 12:
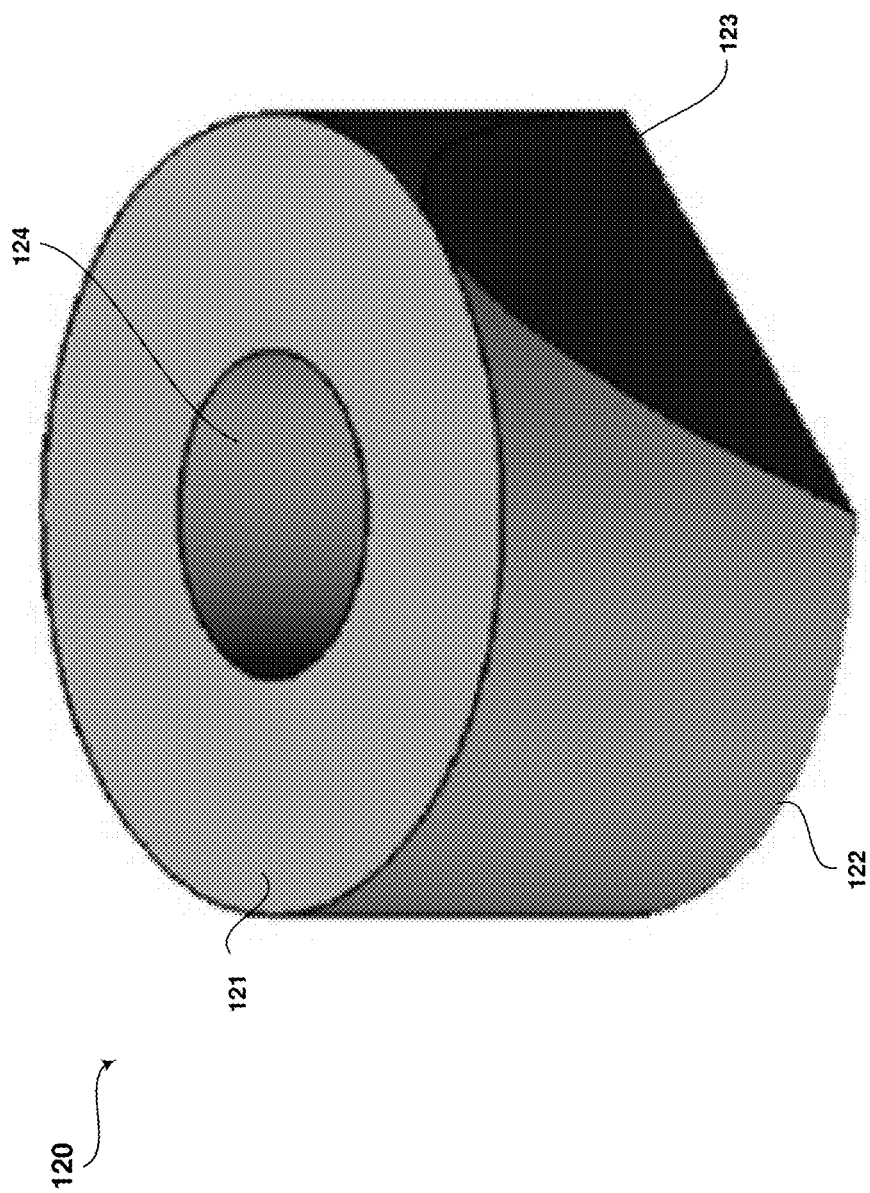
FIG. 12 illustrates perspective view of an exemplary locking wedge of a starting block lock in accordance with an embodiment of the present disclosure.
Figure 13:
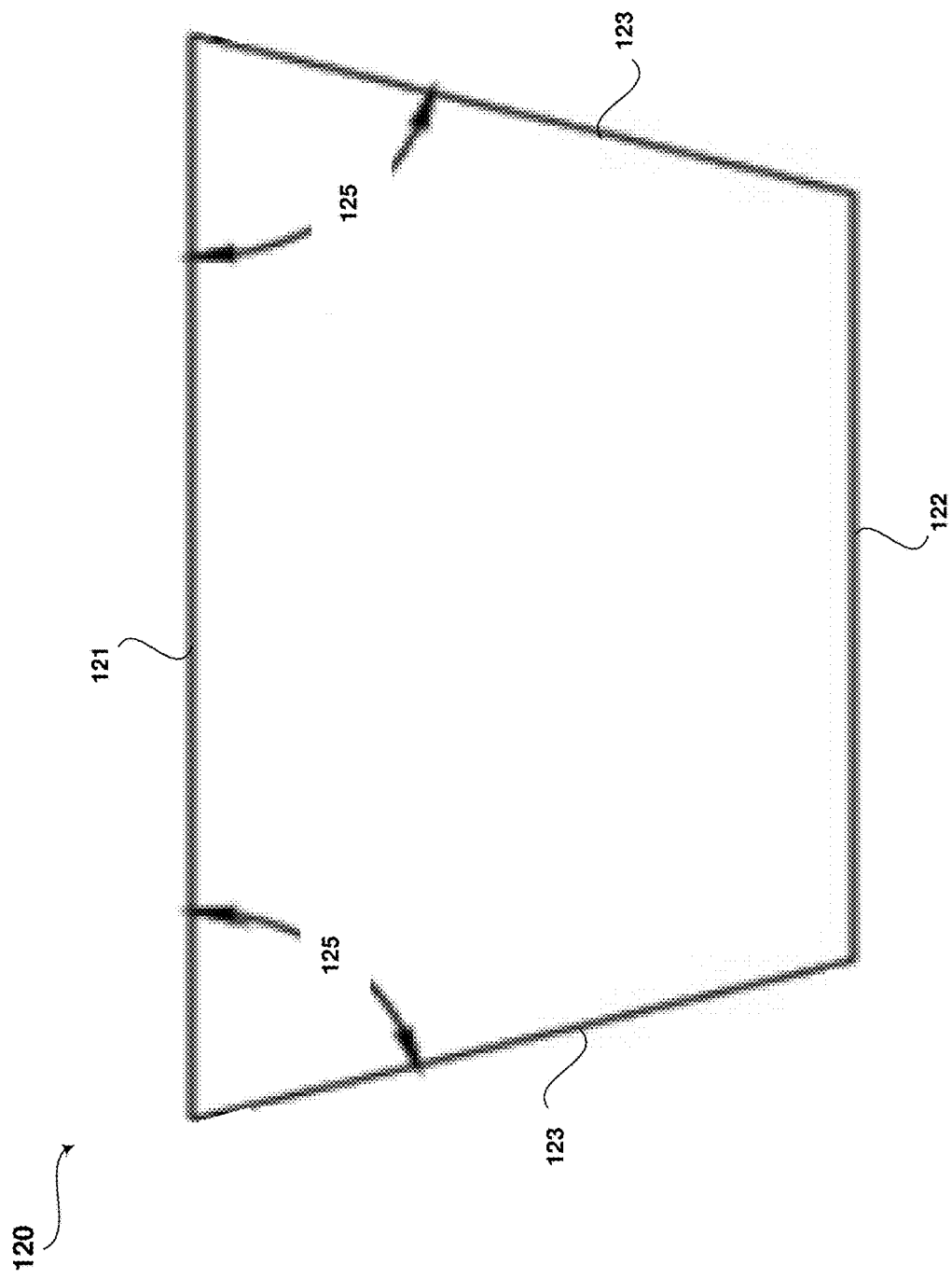
FIG. 13 illustrates a side elevation view of an exemplary locking wedge of a starting block lock in accordance with an embodiment of the present disclosure.

FIG. 12 illustrates perspective view of an exemplary locking wedge 120 of a starting block lock 100 in accordance with an embodiment of the present disclosure. FIG. 13 illustrates a side elevation view of an exemplary locking wedge 120 of a starting block lock 100 in accordance with an embodiment of the present disclosure. Referring to FIGS. 12 and 13, the locking wedge 120 may include an outer surface 121, an inner surface 122, a tapered side surface 123, and an aperture 124. The aperture 124 may extend through the locking wedge 120 from the outer surface 121 to the inner surface 122 and may be configured to receive a rod 110 through the aperture 124. In various embodiments, the interior walls of the locking wedge 120 surrounding the aperture 124 may be threaded to correspond with a threaded portion 114 of the rod 110. The locking wedge may have a generally cylindrical shape. In an exemplary embodiment, the generally cylindrical exterior side walls may include one or more generally flat tapered side surfaces 123 extending between the outer surface 121 and the inner surface 122. The flat side surface portions 123 are tapered such that the locking wedge 120 has a greatest thickness at the outer surface 121 and a least thickness at the inner surface 122. In various embodiments, the tapered side surface 123 may be tapered at an angle 125 of approximately 75 degrees, which is defined as in a range from 70 to 80 degrees. The tapered side surfaces 123 of locking wedges 120A, 120B may be configured to contact and slide across the inside surfaces 133A, 133B of the top 131A and bottom 131B portions of the clamp 130.

The terms "outer" and "inner" with respect to the surfaces 121, 122 may denote an appropriate orientation of the locking wedge 120 with respect to the starting block lock 100. For example, the rod 110 of the starting block lock 100 may be inserted through the apertures 124 in the top locking wedge 120A and the bottom locking wedge 120B as illustrated in FIGS. 4-6 with the outer surfaces 121 facing the outside of the starting block lock 100 and the inside surfaces 122 facing each other on the inside of the starting block lock 100. Accordingly, the outer surface 121 of the top locking wedge 120A may contact the washer 104 between the drive head 112 of the rod 110 and the top locking wedge 120A. The outer surface 121 of the bottom locking wedge 120B may be the surface of the bottom locking wedge 120B nearest the distal end of the rod 110 opposite the drive head 112.

FIG. 14 is a flow diagram 200 that illustrates exemplary steps 202-206 for locking a starting block stem 14 within an anchor 20 in accordance with an embodiment of the present disclosure. Referring to FIG. 14, there is shown a flow chart 200 comprising exemplary steps 202 through 206. Certain embodiments may omit one or more of the steps, and/or perform the steps in a different order than the order listed, and/or combine certain of the steps discussed below. For example, some steps may not be performed in certain embodiments. As a further example, certain steps may be performed in a different temporal order than listed below, including but not limited to simultaneously. Although the method is described with reference to the exemplary elements of the systems described above, it should be understood that other implementations are possible.

At step 202, a starting block lock 100 may be affixed within an anchor insertion end of a stem 14 of a starting block 10. For example, one or more screws 102 or any suitable attachment mechanisms may be inserted through one or more holes at the anchor insertion end of the stem 14 and into one or more screw holes 139 in and/or through an outer surface 138 of a body 136 of a clamp 130 of the starting block lock 100. The one or more screws 102 may secure the starting block lock 100 in a fixed position with respect to the anchor insertion end of the stem 14 of the starting block 10.

At step 204, the anchor insertion end of the stem 14 may be inserted into an anchor assembly 20 embedded in a pool deck. For example, the anchor insertion end of the stem 14 having the affixed starting block lock 100 may be slid into the opening 24 in the body 22 of a conventional anchor assembly 20 such that the starting block lock 100 is substantially within the opening 24 of the anchor assembly 20. The anchor assembly 20 may be embedded in concrete 1, for example, or any suitable material of the pool deck adjacent a pool. In various embodiments, if the anchor assembly 20 includes a lid 26 to cover the opening 24 when not in use, the lid 26 is removed prior to insertion of the anchor insertion end of the stem 14 into the opening 24 of the anchor assembly 20.

At step 206, a threaded rod 110 extending through locking wedges 120 within a clamp 130 of the starting block lock 100 is rotated to translate the locking wedges 120 toward a center of the starting block lock 100 thereby expanding the clamp 130 against the stem 14 and expanding the stem 14 against the inner wall of the anchor assembly 20 to lock the stem 14 of the starting block 10 within the anchor assembly 20. For example, the stem 14 may include one or more slots 16 at the anchor insertion end of the stem 14 that is positioned within the opening 24 of the anchor assembly 20 at step 204. The one or more slots 16 allow the anchor insertion end of the stem 14 to expand if an outward pressure is provided by the starting block lock 100 affixed within the anchor insertion end of the stem 14 at step 202.

The rod 110 extending through the locking wedges 120 disposed within the clamp 130 of the starting block lock 100 may include a drive head 112 that may be driven to rotate the rod 110 by a corresponding tool, such as an extended bar inserted into the stem 14 and mated with the drive head 112. The rotation of the rod 110 in a first direction corresponding with a locking action may move the drive head 112 toward the center of the starting block lock 100. The movement of the drive head 112 may apply a force to the top locking wedge 120A to linearly displace the top locking wedge 120A toward the center of the starting block lock 100. The rotation of the rod 110 in the first direction may simultaneously cause the bottom locking wedge 120B coupled to a threaded portion 114 of the rod 110 to linearly translate toward the center of the starting block 100 such that the top 120A and bottom 120B locking wedges simultaneously move toward each other.

The top 120A and bottom 120B locking wedges may include side surface portions 123 tapering from an outer surface 121 of each of the locking wedges 120 to an inner surface 122 of each of the locking wedges 120. The clamp 130 may include top 131A and bottom 131B portions each having an inside surface 133A, 133B tapering from a body 136 of a central portion 135 of the clamp 130 to distal ends 132A, 132B of the clamp 130. The tapered side surfaces 123 of locking wedges 120A, 120B may be configured to contact and slide across the inside surfaces 133A, 133B of the top 131A and bottom 131B portions of the clamp 130

The linear displacement of the locking wedges 120A, 120B toward each other as the rod 110 is rotated in the first direction may move the tapered inside surfaces 123 of the locking wedges 120A, 120B across each tapered inside surface 133A, 133B of the clamp 130 to create and/or increase an outward force on each inside surface 133A, 133B of each top 131A and bottom 131B portion of each portion of the clamp 130 to expand the starting block lock 100. The expansion of the starting block lock 100 affixed within the anchor insertion end of the stem 14 provides a force to the slotted 16 stem 14 to expand the stem 14 against the walls forming the opening 24 in the body 22 of the anchor assembly 20. The expansion of the slotted 16 stem 14 against the inner walls of the body 22 of the anchor assembly 20 secures and locks the stem 14 into the anchor assembly 20 to prevent removal and wobble of the starting block 10.

In various embodiments, a stem 14 of a starting block 10 locked by the starting block lock 100 within an anchor assembly 20 may be removed by rotating the rod 110 in a second direction opposite the first direction and corresponding with an unlocking action. The rotation of the rod 110 in the second direction may move the locking wedges 120 away from each other and the center of the starting block lock 100. The linear displacement of the locking wedges 120A, 120B away from each other may move the tapered inside surfaces 123 of the locking wedges 120A, 120B in an opposite direction across each tapered inside surface 133A, 133B of the clamp 130 to remove and/or reduce the outward force on each inside surface 133A, 133B of each top 131A and bottom 131B portion of each portion of the clamp 130 to retract the starting block lock 100. The retraction of the starting block lock 100 affixed within the anchor insertion end of the stem 14 reduces and/or removes the force to the slotted 16 stem 14 to retract the stem 14 from the walls forming the opening 24 in the body 22 of the anchor assembly 20. The retraction of the slotted 16 stem 14 from the inner walls of the body 22 of the anchor assembly 20 unlocks the stem 14 from the anchor assembly 20 to allow removal of the starting block 10.

Various embodiments provide a starting block lock 100 configured to lock a stem 14 of a starting block 10 within an opening 24 in a body 22 of an anchor assembly 20 embedded in a pool deck. The starting block lock 100 may comprise a clamp 130, a top locking wedge 120A, a bottom locking wedge 120B, and a rod 110. The clamp 130 may comprise a top portion 130A having an inside surface 133A. The clamp 130 may comprise a bottom portion 131B having an inside surface 133B. The clamp 130 may comprise a body 136 between the top portion 133A and the bottom portion 133B. The body 136 may have a cylindrical bore 137 extending through the body 136 on a longitudinal axis between the top portion 131A and the bottom portion 131B. The top locking wedge 120A may comprise an outer surface 121, an inner surface 122, a side surface, and an aperture 124. At least a portion of the side surface 123 may slidably contact the inside surface 133A of the top portion 131A of the clamp 130. The aperture 124 may extend between and through the outer surface 121 and the inner surface 122 of the top locking wedge 120A. The bottom locking wedge 120B may comprise an outer surface 121, an inner surface 122, a side surface, and an aperture 124. At least a portion of the side surface 123 may slidably contact the inside surface 133B of the bottom portion 131B of the clamp 130. The aperture 124 may extend between and through the outer surface 121 and the inner surface 122 of the bottom locking wedge 120B. The rod 110 may extend through the aperture 124 of the top locking wedge 120A, the cylindrical bore 137 in the body 136, and the aperture 124 of the bottom locking wedge 120B. The rod may be configured to be rotated in a first direction to linearly displace the top locking wedge 120A toward the bottom locking wedge 120B and linearly displace the bottom locking wedge 120B toward the top locking wedge 120A. The linear displacement of the top locking wedge 120A and the bottom locking wedge 120B may provide an outward force against the inside surface 133A of the top portion 131A of the clamp 130 and the inside surface 133B of the bottom portion 131B of the clamp 130, respectively, to expand the clamp 130.

In certain embodiments, the rod 110 comprises a drive head 112 at a first end of the rod 110 closest the top locking wedge 120A and a threaded portion 114 at a second end of the rod 110 closest the bottom locking wedge 120B. In various embodiments, the drive head 112 is hex-shaped. In a representative embodiment, the starting block lock 100 comprises a washer 104 between the drive head 112 and the top locking wedge 120A. In certain embodiments, the aperture 124 of the bottom locking wedge 120B is formed with a threaded wall corresponding with the threaded portion 114 of the rod 110. The bottom locking wedge 120B may be configured to linearly traverse the threaded portion 114 of the rod 110 as the rod 110 is rotated in the first direction.

In various embodiments, the at least the portion of the side surface 123 of the top locking wedge 120A is tapered from the outer surface 121 to the inner surface 122 of the top locking wedge 120A. In a representative embodiment, the at least the portion of the side surface 123 of the bottom locking wedge 120B is tapered from the outer surface 121 to the inner surface 122 of the bottom locking wedge 120B. In certain embodiments, the inside surface 133A of the top portion 131A of the clamp 130 is tapered from a point that the top portion 131A abuts the body 136 of the clamp 130 to a distal end 132A of the clamp 130 at the top portion 131A. In various embodiments, the inside surface 133B of the bottom portion 131A of the clamp 130 is tapered from a point that the bottom portion 131B abuts the body 136 of the clamp 130 to a distal end 132B of the clamp 130 at the bottom portion 131B.

In a representative embodiment, the clamp 130 may comprise two halves 130A, 130B. Each of the halves 130A, 130B of the clamp 130 may comprise a half of the top portion 131A, a half of the body 136, and a half of the bottom portion 131B. In certain embodiments, the two halves 130A, 130B of the clamp 130 are pushed outward and away from each other as the linear displacement of the top locking wedge 120A and the bottom locking wedge 120B provide the outward force against the inside surface 133A of the top portion 131A of the clamp 130 and the inside surface 133B of the bottom portion 131B of the clamp 130, respectively, to expand the clamp 130. In various embodiments, each of the top portion 131A, the body 136, and the bottom portion 131B of the clamp 130 comprises an outer surface 134A, 134B, 138 that is one of generally cylindrically shaped, or generally square shaped.

In certain embodiments, the starting block lock 100 is configured to be affixed within an anchor insertion end of a stem 14 of a starting block 10. In various embodiments, the starting block lock 100 may comprise one or more screws 102. The starting block lock 100 may be affixed within the anchor insertion end of the stem 14 of the starting block 10 by the one or more screws 102 extending through the stem 14 and one or both of into and through the body 136 of the clamp 130. In a representative embodiment, the anchor insertion end of the stem 14 of the starting block 10 expands against inner walls defining an opening 24 in a body 22 of an anchor assembly 20 when the clamp 130 expands to secure the anchor insertion end of the stem 14 in the anchor assembly 20.

In various embodiments, the anchor insertion end of the stem 14 of the starting block 10 comprises one or more slots 16 that allow a diameter of the anchor insertion end of the stem 14 to expand with the expansion of the clamp 130 of the starting block lock 100. In a representative embodiment, the one or more slots 16 are a plurality of slots 16 that are aligned substantially parallel to each other. In certain embodiments, the plurality of slots 16 are positioned substantially equidistant from each other. In various embodiments, the one or more slots 16 extend from a distal end 15 of the stem 14 at the anchor insertion end of the stem 14 to one or both of approximately 6 inches or approximately 10 inches. In a representative embodiment, the each of the one or more slots 16 comprises a keyhole portion 16A and a slotted portion 16B. The keyhole portion 16A may be located at one end of each of the one or more slots 16. The slotted portion 16B may extend from the keyhole portion 16a to a distal end 15 of the stem 14 at the anchor insertion end of the stem 14.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the terms "exemplary" and "example" mean serving as a non-limiting example, instance, or illustration. As used herein, the term "e.g." introduces a list of one or more non-limiting examples, instances, or illustrations. As utilized herein, a structure that is "configured" to and/or "operable" to perform a function requires that the structure is more than just capable of performing the function, but is actually made to perform the function, regardless of whether the function is actually performed.

As used herein, an element recited in the singular and proceeded with the word "a" or "an" should be understood as not excluding the plural of the elements, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment or embodiments disclosed, but that the present disclosure will include all embodiments falling within the scope of the appended claims.

What is claimed is:

1. A starting block lock comprising:
a clamp comprising:
   a top portion having an inside surface,
   a bottom portion having an inside surface, and
   a body between the top portion and the bottom portion, the body having a cylindrical bore extending through the body on a longitudinal axis between the top portion and the bottom portion;
a top locking wedge comprising:
   an outer surface,
   an inner surface,
   a side surface, wherein at least a portion of the side surface slidably contacts the inside surface of the top portion of the clamp, and
   an aperture extending between and through the outer surface and the inner surface of the top locking wedge;
a bottom locking wedge comprising:
   an outer surface,
   an inner surface,
   a side surface, wherein at least a portion of the side surface slidably contacts the inside surface of the bottom portion of the clamp, and
   an aperture extending between and through the outer surface and the inner surface of the bottom locking wedge;
a rod extending through the aperture of the top locking wedge, the cylindrical bore in the body, and the aperture of the bottom locking wedge, wherein the rod is configured to be rotated in a first direction to:
   linearly displace the top locking wedge toward the bottom locking wedge, and
   linearly displace the bottom locking wedge toward the top locking wedge; and
one or more screws,
wherein the linear displacement of the top locking wedge and the bottom locking wedge provide an outward force against the inside surface of the top portion of the clamp and the inside surface of the bottom portion of the clamp, respectively, to expand the clamp, wherein the starting block lock is configured to be affixed within an anchor insertion end of a stem of a starting block by the one or more screws extending through the stem and one or both of into and through the body of the clamp.

2. The starting block lock of claim 1, wherein the rod comprises a drive head at a first end of the rod closest the top locking wedge and a threaded portion at a second end of the rod closest the bottom locking wedge.

3. The starting block lock of claim 2, wherein the drive head is hex-shaped.

4. The starting block lock of claim 2, comprising a washer between the drive head and the top locking wedge.

5. The starting block lock of claim 2, wherein:
the aperture of the bottom locking wedge is formed with a threaded wall corresponding with the threaded portion of the rod, and
the bottom locking wedge is configured to linearly traverse the threaded portion of the rod as the rod is rotated in the first direction.

6. The starting block lock of claim 1, wherein the at least the portion of the side surface of the top locking wedge is tapered from the outer surface to the inner surface of the top locking wedge.

7. The starting block lock of claim 1, wherein the at least the portion of the side surface of the bottom locking wedge is tapered from the outer surface to the inner surface of the bottom locking wedge.

8. The starting block lock of claim 1, wherein the inside surface of the top portion of the clamp is tapered from a point that the top portion abuts the body of the clamp to a distal end of the clamp at the top portion.

9. The starting block lock of claim 1, wherein the inside surface of the bottom portion of the clamp is tapered from a point that the bottom portion abuts the body of the clamp to a distal end of the clamp at the bottom portion.

10. The starting block lock of claim 1, wherein the clamp comprises two halves, each of the halves of the clamp comprising a half of the top portion, a half of the body, and a half of the bottom portion.

11. The starting block lock of claim 10, wherein the two halves of the clamp are pushed outward and away from each other as the linear displacement of the top locking wedge and the bottom locking wedge provide the outward force against the inside surface of the top portion of the clamp and the inside surface of the bottom portion of the clamp, respectively, to expand the clamp.

12. The starting block lock of claim 1, wherein each of the top portion, the body, and the bottom portion of the clamp comprises an outer surface that is one of:
generally cylindrically shaped, or
generally square shaped.

13. The starting block of claim 1, wherein the anchor insertion end of the stem of the starting block expands against inner walls defining an opening in a body of an anchor assembly when the clamp expands to secure the anchor insertion end of the stem in the anchor assembly.

14. The starting block lock of claim 1, wherein the anchor insertion end of the stem of the starting block comprises one or more slots that allow a diameter of the anchor insertion end of the stem to expand with the expansion of the clamp of the starting block lock.

15. The starting block lock of claim 14, wherein the one or more slots is a plurality of slots that are aligned substantially parallel to each other.

16. The starting block lock of claim 15, wherein the plurality of slots are positioned substantially equidistant from each other.

17. The starting block lock of claim 14, wherein the one or more slots extend from a distal end of the stem at the anchor insertion end of the stem to one or both of approximately 6 inches or approximately 10 inches.

18. The starting block lock of claim 14, wherein:
the each of the one or more slots comprises a keyhole portion and a slotted portion,
the keyhole portion is located at one end of each of the one or more slots, and
the slotted portion extends from the keyhole portion to a distal end of the stem at the anchor insertion end of the stem.

19. A starting block lock comprising:
a clamp comprising:
a top portion having an inside surface,
a bottom portion having an inside surface, and
a body between the top portion and the bottom portion, the body having a cylindrical bore extending through the body on a longitudinal axis between the top portion and the bottom portion;
a top locking wedge comprising:
an outer surface,
an inner surface,
a side surface, wherein at least a portion of the side surface slidably contacts the inside surface of the top portion of the clamp, and
an aperture extending between and through the outer surface and the inner surface of the top locking wedge;
a bottom locking wedge comprising:
an outer surface,
an inner surface,
a side surface, wherein at least a portion of the side surface slidably contacts the inside surface of the bottom portion of the clamp, and
an aperture extending between and through the outer surface and the inner surface of the bottom locking wedge; and
a rod extending through the aperture of the top locking wedge, the cylindrical bore in the body, and the aperture of the bottom locking wedge, wherein the rod is configured to be rotated in a first direction to:
linearly displace the top locking wedge toward the bottom locking wedge, and
linearly displace the bottom locking wedge toward the top locking wedge,
wherein the linear displacement of the top locking wedge and the bottom locking wedge provide an outward force against the inside surface of the top portion of the clamp and the inside surface of the bottom portion of the clamp, respectively, to expand the clamp,
wherein the starting block lock is configured to be affixed within an anchor insertion end of a stem of a starting block,
wherein the anchor insertion end of the stem of the starting block expands against inner walls defining an opening in a body of an anchor assembly when the clamp expands to secure the anchor insertion end of the stem in the anchor assembly.

20. The starting block lock of claim 19, wherein the rod comprises a drive head at a first end of the rod closest the top locking wedge and a threaded portion at a second end of the rod closest the bottom locking wedge.

21. The starting block lock of claim 20, wherein the drive head is hex-shaped.

22. The starting block lock of claim 20, comprising a washer between the drive head and the top locking wedge.

23. The starting block lock of claim 20, wherein:
the aperture of the bottom locking wedge is formed with a threaded wall corresponding with the threaded portion of the rod, and
the bottom locking wedge is configured to linearly traverse the threaded portion of the rod as the rod is rotated in the first direction.

24. The starting block lock of claim 19, wherein the at least the portion of the side surface of the top locking wedge is tapered from the outer surface to the inner surface of the top locking wedge.

25. The starting block lock of claim 19, wherein the at least the portion of the side surface of the bottom locking wedge is tapered from the outer surface to the inner surface of the bottom locking wedge.

26. The starting block lock of claim 19, wherein the inside surface of the top portion of the clamp is tapered from a point that the top portion abuts the body of the clamp to a distal end of the clamp at the top portion.

27. The starting block lock of claim 19, wherein the inside surface of the bottom portion of the clamp is tapered from a point that the bottom portion abuts the body of the clamp to a distal end of the clamp at the bottom portion.

28. The starting block lock of claim 19, wherein the clamp comprises two halves, each of the halves of the clamp comprising a half of the top portion, a half of the body, and a half of the bottom portion.

29. The starting block lock of claim 28, wherein the two halves of the clamp are pushed outward and away from each other as the linear displacement of the top locking wedge and the bottom locking wedge provide the outward force against the inside surface of the top portion of the clamp and the inside surface of the bottom portion of the clamp, respectively, to expand the clamp.

30. The starting block lock of claim 19, wherein each of the top portion, the body, and the bottom portion of the clamp comprises an outer surface that is one of:
generally cylindrically shaped, or
generally square shaped.

31. The starting block lock of claim 19, wherein the anchor insertion end of the stem of the starting block comprises one or more slots that allow a diameter of the anchor insertion end of the stem to expand with the expansion of the clamp of the starting block lock.

32. The starting block lock of claim 31, wherein the one or more slots is a plurality of slots that are aligned substantially parallel to each other.

33. The starting block lock of claim 32, wherein the plurality of slots are positioned substantially equidistant from each other.

34. The starting block lock of claim 31, wherein the one or more slots extend from a distal end of the stem at the anchor insertion end of the stem to one or both of approximately 6 inches or approximately 10 inches.

35. The starting block lock of claim 31, wherein:
the each of the one or more slots comprises a keyhole portion and a slotted portion,
the keyhole portion is located at one end of each of the one or more slots, and
the slotted portion extends from the keyhole portion to a distal end of the stem at the anchor insertion end of the stem.

36. A starting block lock comprising:
a clamp comprising:
a top portion having an inside surface,
a bottom portion having an inside surface, and
a body between the top portion and the bottom portion, the body having a cylindrical bore extending through the body on a longitudinal axis between the top portion and the bottom portion;
a top locking wedge comprising:
an outer surface,
an inner surface,
a side surface, wherein at least a portion of the side surface slidably contacts the inside surface of the top portion of the clamp, and
an aperture extending between and through the outer surface and the inner surface of the top locking wedge;
a bottom locking wedge comprising:
an outer surface,
an inner surface,
a side surface, wherein at least a portion of the side surface slidably contacts the inside surface of the bottom portion of the clamp, and
an aperture extending between and through the outer surface and the inner surface of the bottom locking wedge; and
a rod extending through the aperture of the top locking wedge, the cylindrical bore in the body, and the aperture of the bottom locking wedge, wherein the rod is configured to be rotated in a first direction to:
linearly displace the top locking wedge toward the bottom locking wedge, and
linearly displace the bottom locking wedge toward the top locking wedge,
wherein the linear displacement of the top locking wedge and the bottom locking wedge provide an outward force against the inside surface of the top portion of the clamp and the inside surface of the bottom portion of the clamp, respectively, to expand the clamp,
wherein the starting block lock is configured to be affixed within an anchor insertion end of a stem of a starting block,
wherein the anchor insertion end of the stem of the starting block comprises one or more slots that allow a diameter of the anchor insertion end of the stem to expand with the expansion of the clamp of the starting block lock.

37. The starting block lock of claim 36, wherein the rod comprises a drive head at a first end of the rod closest the top locking wedge and a threaded portion at a second end of the rod closest the bottom locking wedge.

38. The starting block lock of claim 37, wherein the drive head is hex-shaped.

39. The starting block lock of claim 37, comprising a washer between the drive head and the top locking wedge.

40. The starting block lock of claim 37, wherein:
the aperture of the bottom locking wedge is formed with a threaded wall corresponding with the threaded portion of the rod, and
the bottom locking wedge is configured to linearly traverse the threaded portion of the rod as the rod is rotated in the first direction.

41. The starting block lock of claim 36, wherein the at least the portion of the side surface of the top locking wedge is tapered from the outer surface to the inner surface of the top locking wedge.

42. The starting block lock of claim 36, wherein the at least the portion of the side surface of the bottom locking wedge is tapered from the outer surface to the inner surface of the bottom locking wedge.

43. The starting block lock of claim 36, wherein the inside surface of the top portion of the clamp is tapered from a point that the top portion abuts the body of the clamp to a distal end of the clamp at the top portion.

44. The starting block lock of claim 36, wherein the inside surface of the bottom portion of the clamp is tapered from a point that the bottom portion abuts the body of the clamp to a distal end of the clamp at the bottom portion.

45. The starting block lock of claim 36, wherein the clamp comprises two halves, each of the halves of the clamp comprising a half of the top portion, a half of the body, and a half of the bottom portion.

46. The starting block lock of claim 45, wherein the two halves of the clamp are pushed outward and away from each other as the linear displacement of the top locking wedge and the bottom locking wedge provide the outward force against the inside surface of the top portion of the clamp and the inside surface of the bottom portion of the clamp, respectively, to expand the clamp.

47. The starting block lock of claim 36, wherein each of the top portion, the body, and the bottom portion of the clamp comprises an outer surface that is one of:

generally cylindrically shaped, or generally square shaped.

48. The starting block lock of claim 36, wherein the one or more slots is a plurality of slots that are aligned substantially parallel to each other.

49. The starting block lock of claim 48, wherein the plurality of slots are positioned substantially equidistant from each other.

50. The starting block lock of claim 36, wherein the one or more slots extend from a distal end of the stem at the anchor insertion end of the stem to one or both of approximately 6 inches or approximately 10 inches.

51. The starting block lock of claim 36, wherein:

the each of the one or more slots comprises a keyhole portion and a slotted portion, the keyhole portion is located at one end of each of the one or more slots, and the slotted portion extends from the keyhole portion to a distal end of the stem at the anchor insertion end of the stem.

* * * * *